United States Patent [19]

Catotti

[11] Patent Number: 4,929,519
[45] Date of Patent: May 29, 1990

[54] WOUND ELECTRODE ASSEMBLY FOR AN ELECTROCHEMICAL CELL

[75] Inventor: Arthur J. Catotti, Gainesville, Fla.

[73] Assignee: Gates Energy Products, Inc., Gainesville, Fla.

[21] Appl. No.: 383,376

[22] Filed: Jul. 20, 1989

[51] Int. Cl.⁵ ............................................. H01M 6/10
[52] U.S. Cl. ....................................... 429/94; 429/222
[58] Field of Search ................... 429/94, 206, 222, 223

[56] References Cited

U.S. PATENT DOCUMENTS

| | | | |
|---|---|---|---|
| 4,105,832 | 8/1978 | Sugalski | 429/94 |
| 4,460,666 | 7/1984 | Dinkler et al. | 429/94 X |
| 4,565,752 | 1/1986 | Goebel et al. | 429/94 |
| 4,664,989 | 5/1989 | Johnson | 429/94 |
| 4,689,880 | 9/1987 | Brezillon et al. | 429/222 X |
| 4,802,275 | 2/1989 | Freluche | 429/94 X |

*Primary Examiner*—Anthony Skapars
*Attorney, Agent, or Firm*—Curtis H. Castleman, Jr.; John L. Isaac; H. W. Oberg, Jr.

[57] ABSTRACT

A wound electrode assembly for use in a sealed electrochemical cell. The wound electrode assembly has at least one electrode comprised of an electrically conductive substrate and an electrochemically active material secured to at least one face of the substrate. This one electrode defines an outer wrap for the electrode assembly. The electrochemically active material is absent from at least a portion of the exterior of the outer wrap to permit the first substrate in the outer wrap to contact at least a portion of the cell container into which the wound electrode assembly is positioned.

30 Claims, 3 Drawing Sheets

WOUND ELECTRODE ASSEMBLY FOR AN ELECTROCHEMICAL CELL

BACKGROUND OF THE INVENTION

The present invention relates to a wound electrode assembly for an electrochemical cell, and more particularly, to a wound electrode assembly wherein a portion of an exterior face of a substrate or grid of that portion of an electrode plate defining the outermost or peripheral layer or wrap of the electrode assembly is substantially exposed and contacts at least a portion of a container as assembled in a sealed electrochemical cell.

Conventionally, wound electrode assemblies for electrochemical cells are formed from two separate electrode plates of opposite polarity with a layer of interposed separator material. The negative electrode plate can be of a pressed or pasted design. An aqueous mixture of an electrochemically active material and a binder may be applied to each face of an electrically conductive, perforated substrate and pressed on to the substrate, for example by passing the substrate between rollers. The substrate can be stippled to improve adhesion between the substrate and the electrochemically active material Alternatively, both the positive and negative electrodes may be of a sintered design. A perforated or wire mesh steel substrate of, for example, 2-3 mils thickness, is sintered with a carbonyl nickel powder layer or layers to form a porous electrode plate of, for example, 20-30 mils thickness. The resultant porous plate is conventionally impregnated with a solution of an electrochemically active material. The electrochemically active material is precipitated out of solution within the plate.

In addition, an ultra high porosity positive electrode plate can be utilized in which an electrochemically active material may be bonded to a porous substrate such as a highly porous metal foam by, for example, pressing a slurry or paste containing the active material on to and within interstices of the substrate. The substrate may then be compacted to form a positive electrode plate having a desired thickness.

In one method of manufacturing cylindrical cells, a negative electrode plate, a positive electrode plate, and two pieces of separator are wound into a spiral such that surfaces of the positive and the negative electrode plates are juxtaposed throughout the cell. These cell components are wound around a removable arbor which is positioned within a nest having a diameter approximating that of the container of the electrochemical cell. As thus conventionally manufactured, the outer wrap of the electrode assembly is a layer of separator material which prevents the electrochemically active material on the outer periphery of the electrode assembly from being scraped off as the assembly is stuffed into a container during cell manufacturing.

Electrical contact between the electrode plates and the cell container of a wound electrochemical cell has been made by connecting one of the electrode plates to the sidewall or bottom of the cell container or housing while the electrode plate of opposite polarity is electrically connected to the top of the container or housing which is electrically insulated from the bottom or sidewall thereof. When an electrode plate is electrically connected to the bottom of a cell, a current collector tab which may be integrally formed in or which is attached, for example, by welds, to the electrode plate is secured to the cell bottom, for example, by inserting a welding tip through the center of the electrode assembly to weld the tab to the bottom. Such assembly is relatively difficult and slow. Alternatively, the collector tab can be bent back upon the wound electrode assembly to make pressure contact with the container or housing as disclosed in U.S. Pat. No. 4,049,882.

The electrode plate which forms the outer wrap or periphery of the electrode assembly may be electrically connected to the sidewall of the cell container or housing by contiguity. Such contact may be made by removing at least a portion of the outer layer or wrap of separator material thereby exposing the outer wrap of the electrode plate for contact with the container sidewalls. Thus, the outermost layer of electrochemically active material of the exposed electrode plate contacts the container sidewall and provides electrical communication between the substrate of the outer wrap of the electrode plate and the sidewall. U.S. Pat. No. 4,663,247 discloses a sealed galvanic cell wherein the outer exposed electrode of a coiled electrode assembly makes electrical contact with the wall of the container within which the assembly is disposed through an opening in the outer separator layer. U.S. Pat. No. 4,259,416 relates to a spiral electrode which is housed in a battery vessel and has the positive plate located at the outermost circumference of the spiral electrode electrically connected to the vessel by means of contact pressure. However, the electrochemically active material present on the electrode plate defining the outermost wrap or layer of conventional wound electrode assemblies possesses inherent electrical resistance which results in cell inefficiencies. In addition, such active material does not enter into electrochemical reactions occurring within the cell between opposing faces of positive and negative electrode plates during charge and discharge cycles.

Accordingly, it is an object of the present invention to provide a wound electrode assembly for use in a sealed electrochemical cell which provides for direct electrical contact between a portion of the substrate or grid of one electrode plate thereof and a portion of the cell container.

Another object of the present invention is to provide a wound electrode assembly which can be easily manufactured and as assembled within a sealed electrochemical cell will result in a substantially higher coulombic cell capacity and improved cell performance characteristics.

A further object of the present invention is to provide a wound electrode assembly which is easily assembled within a sealed electrochemical cell and, as assembled, simplifies the construction of the electrochemical cell.

SUMMARY OF THE INVENTION

To achieve the foregoing and other objects, and in accordance with the purposes of the present invention, as embodied and broadly described herein, one characterization of the present invention comprises a sealed electrochemical cell having a wound electrode assembly positioned within a container. The wound electrode assembly has at least one electrode comprised of an electrically conductive substrate and an electrochemically active material secured to at least one face of the substrate. This one electrode defines an outer wrap for the electrode assembly. At least a portion of the substrate in the outer wrap contacts a portion of the container.

In yet another characterization of the present invention, a wound electrode assembly for use in a sealed electrochemical cell is provided which comprises a first electrode plate having an electrically conductive substrate and a first electrochemically active material secured to at least one face of the first substrate, a second electrode plate having a second electrically conductive substrate and an electrochemically active material secured to at least one face of the second substrate, and separator material interposed between the first electrode plate and the second electrode plate so as to electrically insulate the first electrode plate from the second electrode plate throughout said assembly. The first electrode plate, the second electrode plate and the separator material are wound such that the first electrode plate defines an outer wrap for the electrode assembly. Electrochemically active material is absent from at least a portion of the exterior of the outer wrap of the electrode assembly.

In yet another characterization of the present invention, a sealed electrochemical cell is provided which comprises a container and a wound electrode assembly positioned within the container. The wound electrode assembly comprises a first electrode plate having a first electrically conductive, porous substrate and a first electrochemically active material secured to at least one face of the first substrate. The first electrode plate defines an outer wrap for the electrode assembly. The electrochemically active material is absent from at least a portion of the exterior face of the outer wrap to permit the first substrate in the outer wrap to contact at least a portion of the container.

BRIEF DESCRIPTION OF THE DRAWINGS

The accompanying drawings, which are incorporated in and form part of the specification, illustrate the embodiments of the present invention and, together with the description, serve to explain the principles of the invention. In the drawings.

DETAILED DESCRIPTION OF THE PREFERRED EMBODIMENTS

Figure 1:
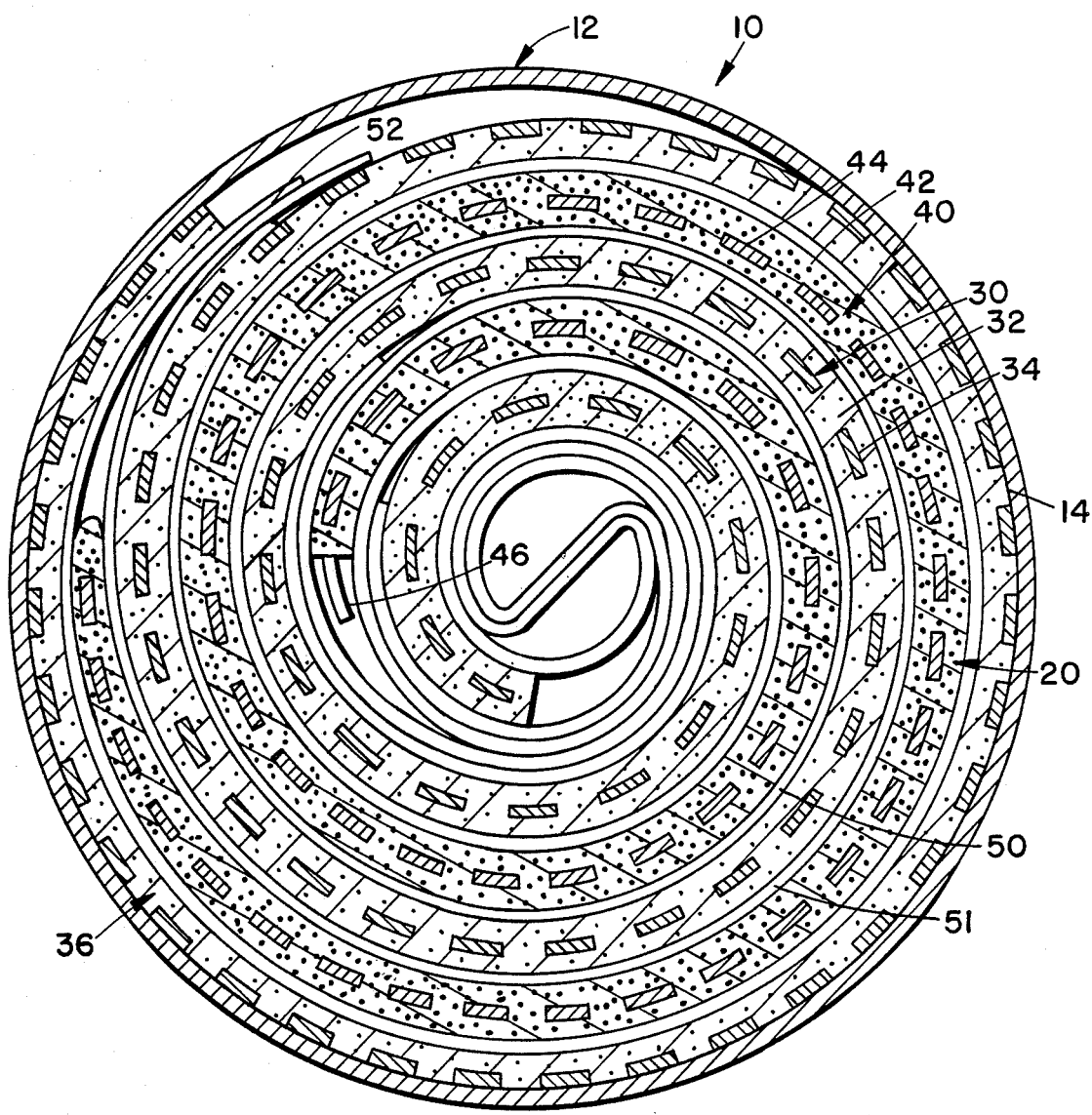
FIG. 1 is a cross-sectional view of one embodiment of the wound electrode assembly of the present invention as installed within a container of a sealed electrochemical device.

A sealed electrochemical cell illustrated generally as 10 in FIG. 1 comprises a container 12 and a wound electrode assembly 20 which is dimensioned and configured to be positioned within container 12 and be contiguous with the inner sidewall 14 of container 12. Container 12 may be constructed of any suitable electrically conductive material, for example nickel plated steel, having a thickness of about 0.010 to about 0.015 inches.

Figure 2:
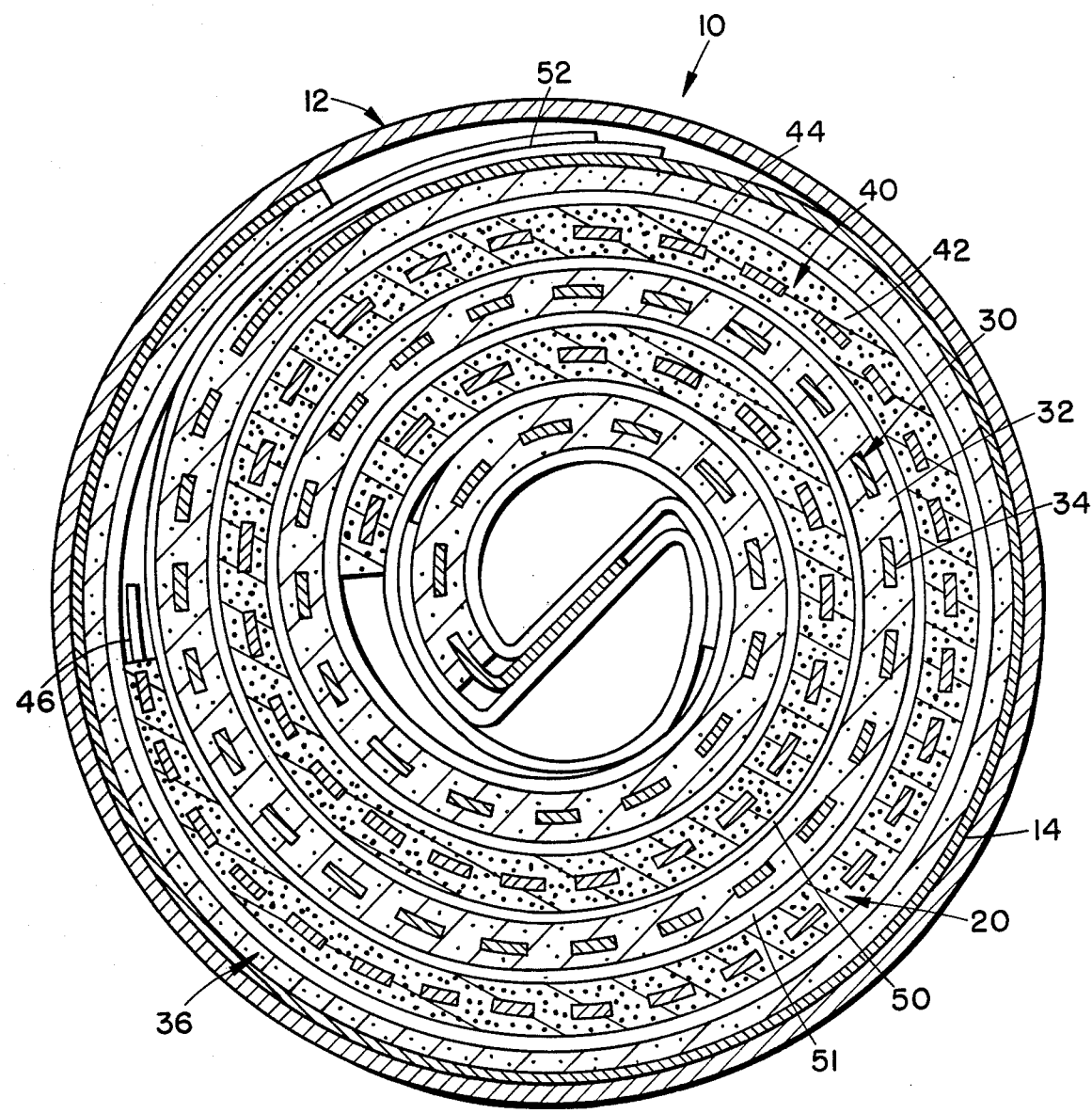
FIG. 2 is a cross-sectional view of one embodiment of the wound electrode assembly of the present invention as installed within a container of a sealed electrochemical device.

Electrode assembly 20 is comprised of a first electrode plate 30, a second electrode plate 40 of opposite polarity, and two separate distinct layers of a porous, flexible separator material 50, 51 which are positioned on each face of first electrode 30 to electrically insulate electrode plate 30 from electrode plate 40 throughout the entire cell. The two layers of separator material 50, 51 can be formed from a single sheet of material or from two separate sheets, as illustrated in FIGS. 1 and 2. Any suitable separator material can be employed in the present invention, for example, unwoven nylon or polypropylene. Electrode assembly 20 is formed by winding the components thereof about a removable arbor within a nest (not illustrated) as more fully described in U.S. Pat. No. 4,203,206 which is incorporated herein by reference.

As illustrated, negative electrode plate 30 is formed by bonding or attaching a layer of a suitable electrochemically active material 32 to each face or side of a porous substrate 34. Porous substrate 34 may be constructed of any suitable electrically conductive material, for example, nickel plated steel which has been perforated. The electrochemically active material 32 can be affixed to porous substrate 34 by pressing suitable paste which is a mixture primarily of active material, for instance cadmium oxide, cadmium hydroxide and cadmium metal, and binder onto and through the perforations of each porous substrate. Alternatively, the active material is preferably bonded to the substrate by means of simultaneously extruding from a cross-head die an organic slurry containing the active material in suspension onto both sides of the substrate thereby permeating the substrate and forming a layer on each face thereof. An elastomeric binder is also incorporated into the organic slurry to maintain the electrochemically active material in suspension within the organic solvent.

The preferred binders are a styrene-butadiene copolymer manufactured under the trade name of AMERIPOL by the B. F. Goodrich Company or styrene-ethylene/butylene-styrene block copolymers manufactured under the trade name KRATON by the Shell Chemical Co. Suitable organic solvents useful as a carrier in formulating such organic slurries may include naphthol spirits, Stoddard solvent, decane, xylenes, iso-paraffins, and mixtures thereof. After extrusion onto the substrate, the organic slurry is dried to remove the organic solvent and to form a microporous, flexible coating on the substrate wherein particles of electrochemically active material are bound together and to the substrate by means of the elastomeric binder.

Also as illustrated, positive electrode plate 40 is preferably formed by sintering a low density metal power, for example, a carbonyl nickel powder, on each face of a porous substrate 44 which can be any suitable electrically conductive material, for example, nickel plated steel, which has been perforated. Conventionally, the electrode plate thus formed is loaded by impregnating the plate with an aqueous solution containing an electrochemically active material which subsequently is precipitated out of solution thereby forming an area on each face of substrate 44 and within the perforations through the substrate which contains an electrochemically active material 42.

As thus manufactured, the electrode assembly 20 is inserted into and housed within container 12. To electrically connect electrode plate 40 to a portion of container 12 which is electrically insulated from sidewall 14, for example, a cover (not illustrated), an electrically conductive tab (not illustrated) is welded to an end portion 46 of substrate 40 which is not coated with active material, is dimensioned to extend beyond substrate 40, and is secured in known manner to the cover by any suitable means, such as laser welding. This end portion may be at either end of the wound electrode 40 as illustrated in FIGS. 1 and 2. Alternatively, the electrically conductive tab may be integrally formed with substrate 40.

In accordance with the present invention, the exterior face of substrate 34 of the outermost or peripheral layer or wrap of electrode plate 30 is exposed and contacts the sidewall 14 of container 12 to electrically connect the outermost or peripheral layer or wrap of electrode plate 30 directly to the side wall 14. To expose the exterior face of substrate 34 of the outermost or peripheral layer or wrap of electrode plate 30, outer layer of separator material 50, 51 and the layer of active material 32 are removed from the outermost or peripheral layer or wrap of electrode plate 30. The outer layer of separator material is removed while winding the components of the electrode assembly of the present invention about a removable arbor. A portion 52 of the outer layer of separator material will not be removed so as to overlap the exposed substrate 34 thereby ensuring against electrical communication between electrode plates. Prior to winding, the layer of active material 32 can be scarfed from the exterior of the outermost or peripheral layer or wrap of electrode plate 30 thereby exposing substrate 34 so that electrical contact can be made to substantially the entire peripheral surface of exposed substrate 34 and the sidewall 14 of container 12. This layer of active material 32 can be scarfed by scraping the exterior face of substrate 34 in the outer layer or wrap 36 by suitable means, for example, a blade. Alternatively, electrode plate 30 is preferably formed such that the outer wrap or layer 36 of substrate 34 does not have a layer of surface active material 32 formed on the exterior face thereof. Preferably, outer wrap or layer 36 of substrate 34 is substantially imperforate (as illustrated in FIG. 2) and has a layer of surface active material 32 extruded only on the interior face thereof.

Although the negative and positive electrode plates 30, 40 of the wound electrode assembly of the present invention have been illustrated and described as being of a particular electrode construction, the electrode plates can be formed in other manners without departing from the spirit and scope of the present invention. For example, negative electrode plate 30 can be formed by sintering in a manner described herein with respect to positive electrode plate 40. Positive electrode plate 40 may be formed by forcing a slurry or paste containing an electrochemically active material 42 into a highly porous metal foam substrate and compacting the substrate to the desired electrode plate thickness. And although the outer layer or wrap of the wound electrode assembly 20 of the present invention has been illustrated as being formed by a portion of negative electrode plate 30, the outer layer or wrap can also be formed by a portion of positive electrode plate 40 where permitted by design constraints of a given electrochemical cell. Where positive electrode plate 40 is utilized to form the outer layer or wrap of electrode assembly 20 and is constructed utilizing a metal foam substrate, the substrate can be exposed for contact with the cell container or housing in accordance with the present invention by masking the exterior face of that portion of plate 40 forming the outer layer or wrap of electrode assembly 20 with, for example, tape. Such masking prevents slurry or paste containing electrochemically active material and applied to the interior face of that portion of plate 40 from extending through and onto the exterior face thereof. Subsequent to pasting, the tape is removed, exposing the outer portion of the substrate.

Figure 3:
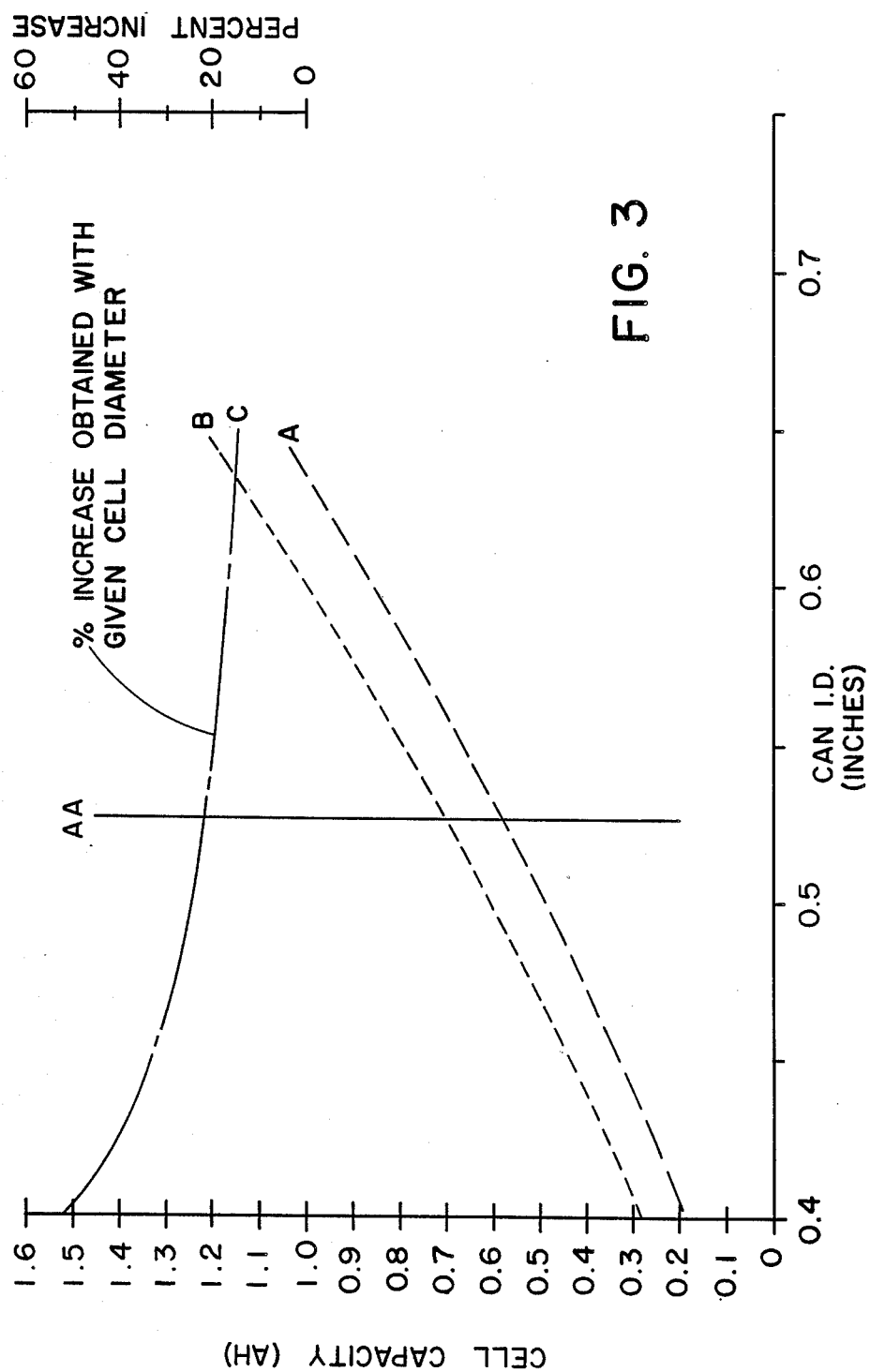
FIG. 3 is a graphical illustration of the increased electrochemical cell capacity obtained with the wound electrode assembly of the present invention for a sealed nickel-cadmium cell.

The electrode assembly of the present invention results in improved contact between one electrode plate and the container of an electrochemical cell. In addition the volume normally occupied by separator and active material on the outside surface of the outer wrap of conventional wound electrode assemblies now becomes available for introducing additional positive and/or negative electrode active material in the same volume. The amount of additional electrochemically active material and the attendant increase in electrical capacity of a given electrochemical cell are a function of the thickness of each component of the wound electrode assembly of the present invention and the diameter of the container into which the assembly is positioned. FIG. 3 is a graphical illustration of the increase in cell capacity obtained with the wound electrode assembly of the present invention for a nickel-cadmium cell. Calculations were based on a positive plate thickness of 0.030 inch and a width of 1.575 inches, a negative plate thickness of 0.021 inch, separator thickness of 0.006 inch, and an arbor diameter of 0.187 inch. Curve A of FIG. 3 represents the electrical capacity of a conventionally manufactured nickelcadmium cell, curve B represents the electrical capacity of a nickel-cadmium cell utilizing the wound electrode assembly of the present invention, and curve C represents the percentage of increase of cell capacity obtained in utilizing the wound electrode assembly of the present invention. The increase in cell capacity utilizing the wound electrode assembly of the present invention is greater for smaller diameter cells. As illustrated, the increase in cell capacity for a AA sized cell is greater than 20%.

The following examples describe the manner and process of making and using the present invention and set forth the best mode contemplated by the inventor of carrying out the invention but are not to be construed as limiting the scope thereof.

EXAMPLE 1

Several cylindrical, sealed nickel cadmium AA size cells were each wound in accordance with the present invention on a 0.187 inch arbor from a conventionally sintered positive electrode plate impregnated with nickel hydroxide and an extrusion coated elastomer bonded cadmium oxide negative electrode plate. The positive and negative electrode plates were interposed with a non-woven nylon separator. The negative electrode plate was formed such that the exterior surface of the outer layer or wrap thereof was substantially free of elastomer bonded cadmium oxide and the outer layer of separator was sized so that the substrate of the outer layer or wrap was exposed. The resultant wound electrode assembly was positioned within a cylindrical cell container such that the exposed substrate of the outer layer or wrap of negative electrode plate contacted the container side wall. Prior to sealing the cells, 1.95 milliliters of 27 weight percent KOH was added thereto. The cells were then sealed and formed at 70 milliamperes for 24 hours and discharged at 700 milliamperes. Cell capacities for these cells are summarized below in Table 1.

EXAMPLE 2

A high energy density positive electrode plate was manufactured by filling a high porosity nickel foam structure with a slurry of nickel hydroxide and other active materials and drying and compressing the electrode plate to a thickness set forth in Table 1. The resultant positive electrode plate was employed with the components of and wound, activated, and formed in accordance with Example 1 to form a plurality of cells. Cell capacities for such cells are summarized below in Table 1.

EXAMPLE 3

A plurality of cells were constructed, activated and formed in accordance with Example 2 except that cadmium oxide and separator were present on the exterior of the substrate of the outer layer or wrap of the negative electrode plate in accordance with conventional practice. The negative electrode plate had a nickel tab attached to edge of the plate which was welded to the bottom of the cell container.

The results of Examples 1, 2, and 3 are summarized below in Table 1. Cell capacities are set forth both as a value which is typical of the measured values and as a value rated on a "C" rate scale, i.e., a one hour rate.

TABLE 1

| EXAM- | POSITIVE | | | NEGATIVE | | | SEPARATOR | | | CAPACITY | |
|---|---|---|---|---|---|---|---|---|---|---|---|
| PLE | Thickness | Length | Width | Thickness | Length | Width | Thickness | Length | Width | Typical | Rating |
| 1 | 0.030 in. | 2.48 in. | 1.575 in. | 0.021 in. | 3.92 in. | 1.575 in. | 0.006 in. | 9.03 in. | 1.78 in. | 720 mAhr | 600 mAhr |
| 2 | 0.030 in. | 2.48 in. | 1.575 in. | 0.021 in. | 3.92 in. | 1.575 in. | 0.006 in. | 9.03 in. | 1.78 in. | 821 mAhr | 700 mAhr |
| 3 | 0.030 in. | 1.94 in. | 1.575 in. | 0.021 in. | 3.38 in. | 1.575 in. | 0.006 in. | 10.20 in. | 1.78 in. | 638 mAhr | 550 mAhr |

As evident from the results set forth above, the length of separator necessary to construct the electrode assemblies of Examples 1 and 2 in accordance with the present invention was substantially less that that necessary to construct the conventional cells of Example 3. This resulted in a significant increase in the length of both the positive and negative electrode plates in the wound electrode assemblies and in the capacities of the cells employing such electrode assemblies according to the invention.

The wound electrode assembly of the present invention may be used in a variety of sealed, electrochemical cells, such as, nickel-cadmium, metal hydride, and lithium secondary cells. And while the wound electrode assembly of the present invention has been illustrated as being spirally wound, the present invention is equally applicable to other wound configurations, for example, a serpentine or flat wound configuration. The invention has use in specific battery applications where an improved electrical connection between a wound electrode assembly and an electrically conductive cell container and an increased cell capacity is desired.

While the preferred embodiments have been fully described and depicted for the purpose of explaining the principles of the present invention, it will be appreciated by those skilled in the art that various modifications and changes may be made thereto without departing from the scope of the invention set forth in the appended claims.

What is claimed is:

1. In a sealed electrochemical cell having a wound electrode assembly positioned within a container, said electrode assembly having at least one electrode comprised of an electrically conductive substrate and an electrochemically active material secured to at least one face of the substrate, said one electrode defining an outer wrap for said electrode assembly, the improvement comprising:

at least a portion of said substrate on one side thereof in said outer wrap being free of electrochemically active material and directly contacting a portion of said container, and said electrochemically active material being secured to at least a portion of the substrate in said outer wrap on the other side thereof directly opposite said one side making contact with the container.

2. The improvement of claim 1 wherein said container has a side wall and said portion of said container is a portion of said side wall.

3. The improvement of claim 2 wherein said portion of said substrate contacts a substantial portion of said side wall.

4. The improvement of claim 1 wherein substantially all of said substrate is perforated.

5. The improvement of claim 1 wherein said portion of said substrate in said outer wrap is substantially imperforate.

6. The improvement of claim 1 wherein substantially all of said substrate in said outer wrap electrically contacts a portion of said container.

7. The improvement of claim 1 wherein said electrode assembly is spirally wound and comprises a positive electrode plate coated with a first electrochemically active material, a negative electrode plate coated with a second electrochemically active material, and separator material interposed between said positive electrode plate and said negative electrode throughout substantially all of said cell.

8. A wound electrode assembly for use in a sealed electrochemical cell comprising:

a first electrode plate having a first electrically conductive substrate and a first electrochemically active material secured to at least one face of said first substrate;

a second electrode plate having a second electrically conductive substrate and an electrochemically active material secured to at least one face of said second substrate; and separator material interposed between said first electrode plate and said second electrode plate to electrically insulate said first electrode plate from said second electrode plate throughout said assembly, said first electrode plate, said second electrode plate and said separator material being wound such that said first electrode plate defines an outer wrap for said electrode assembly, said electrochemically active material being absent from at least a portion of the exterior of said outer wrap so as to expose substrate therealong, arranged and adapted to make contact with an associated cell container, and said electrochemically active material being present on the interior side of said outer wrap opposite said exposed substrate of the first electrode plate.

9. The wound electrode assembly of claim 8 wherein said first electrode plate, said second electrode plate, and said at least one layer of separator material are spirally wound.

10. The wound electrode assembly of claim 8 wherein substantially all of said first electrically conductive substrate is perforated.

11. The wound electrode assembly of claim 8 wherein said first electrically conductive substrate in said outer wrap is substantially imperforate.

12. The wound electrode assembly of claim 8 wherein said electrochemically active material is absent from substantially all of the exterior of said outer wrap.

13. An electrochemical cell comprising:
a sealed container; and
a wound electrode assembly positioned within said container and comprising a first electrode plate having a first electrically conductive substrate and a first electrochemically active material secured to at least one face of said first substrate, said first electrode plate defining an outer wrap for said electrode assembly, said electrochemically active material being absent from at least a portion of the exterior face of said outer wrap so that said first substrate in said outer wrap contacts at least a portion or said container, said first electrochemically active material being present along the interior face of said outer wrap of the first electrode opposite positions where said first substrate contacts said container.

14. The electrochemical cell of claim 1 wherein said wound electrode assembly further comprises a second electrode plate having a second electrically conductive substrate and an electrochemically active material secured to at least one face of said second substrate, and separator material interposed between said first electrode plate and said second electrode plate to electrically insulate said first electrode plate from said second electrode plate throughout said assembly.

15. The electrochemical cell of claim 13 wherein said wound electrode assembly is spirally wound.

16. The electrochemical cell of claim 13 wherein said container has a side wall and said portion of said container is a portion of said side wall.

17. The electrochemical cell of claim 16 wherein said first substrate contacts a substantial portion of said side wall.

18. The electrochemical cell of claim 17 wherein said first substrate contacts substantially all of said side wall.

19. The electrochemical cell of claim 13 wherein said electrochemically active material is absent from substantially all of said exterior of said outer wrap.

20. The electrochemical cell of claim 13 wherein said cell is a nickel-cadmium cell and said first electrode plate is the negative plate.

21. The electrochemical cell of claim 20 wherein said first electrode has been produced by extrusion coating said substrate with an organic slurry of electrochemically active cadmium material containing an elastomeric binder.

22. The electrochemical cell of claim 21 wherein said substrate of the first electrode is scarfed, thereby defining such portion of the exterior face of the outer wrap in which active material is absent.

23. The electrochemical cell of claim 13 wherein said first electrochemically active material is secured by pressing or pasting onto said first substrate.

24. The electrochemical cell of claim 14 wherein said second electrode plate is formed of a highly porous metal foam substrate filled with a slurry of electrochemically active nickel compound.

25. The electrochemical cell of claim 14 wherein the exterior face of said outer wrap is totally free of separator.

26. An electrochemical cell comprising:
a sealed container; and
a wound electrode assembly positioned within said container and comprising a first electrode plate having a first electrically conductive substrate of a hybrid construction formed of a metal strip a portion of which is perforated and a further portion of which is imperforate, and a first electrochemically active material secured by pressing or pasting to at least one face of said first substrate, said first electrode plate defining an outer wrap for said electrode assembly in which the imperforate portion of said substrate is positioned; and
said electrochemically active material being absent from at least a portion of the exterior face of said outer wrap so that the imperforate portion of said first substrate in said outer wrap directly contacts at least a portion of said container to make electrical contact therewith, and said first electrochemically active material being present along the interior face of said outer wrap of the first electrode opposite portions where said imperforate portion of said first substrate contacts said container.

27. The electrochemical cell of claim 26 where in said first electrode plate is a pasted cadmium electrode plate, and wherein the wound assembly further comprises a second electrode plate formed from electrochemically active nickel compound, and wherein a separator material is interposed between the first and second electrode plates, and alkaline electrolyte is absorbed in the first and second electrode plates and separator.

28. A sealed nickel-cadmium electrochemical cell comprising:
a sealed container having an inner wall formed of an electrically conductive material;
a spirally wound electrode assembly positioned within said container and comprising a cadmium electrode plate formed of first electrically conductive substrate and electrochemically active cadmium material secured to at least one face of said first substrate, said cadmium electrode plate defining at least a portion of an outer wrap for said electrode assembly, said electrochemically active cadmium material being present on the interior face of, and absent from at least a portion of the exterior face of, said outer wrap so that said first substrate in said outer wrap contacts at least a portion of the inner wall of said container to effect electrical contact therewith; and said electrochemically active material being present on the interior face of said outer wrap of the first substrate opposite portions where said first substrate contacts the inner wall of said container;
a positive electrode plate formed of a second electrically conductive substrate and electrochemically active nickel material compound secured to at least one face of said second substrate;
a separator material interposed between said cadmium electrode plate and said nickel electrode plate to electrically insulate said electrode plates along their length substantially throughout said assembly; and
an electrolyte formed of potassium hydroxide contained within the wound assembly.

29. The electrochemical cell of claim 28 wherein the substrate forming said cadmium electrode is of a hybrid construction, the interior convolutions of which are perforate, and bear layers of cadmium electrochemically active material on both faces of the perforated substrate, and a second portion of the substrate associated with that portion of the cadmium electrode defining the outer wrap for the electrode assembly, being substantially imperforate and making said contact with at least a portion of said container inner wall.

30. The electrochemical cell of claim 28 wherein the exterior face of said outer wrap is totally free of separator.

* * * * *